(12) United States Patent
Peranandam et al.

(10) Patent No.: US 11,195,063 B2
(45) Date of Patent: Dec. 7, 2021

(54) HIDDEN HAZARD SITUATIONAL AWARENESS

(71) Applicant: GM GLOBAL TECHNOLOGY OPERATIONS LLC, Detroit, MI (US)

(72) Inventors: Prakash Mohan Peranandam, Rochester Hills, MI (US); Erik B. Golm, Warren, MI (US); Meng Jiang, Rochester Hills, MI (US); Shengbing Jiang, Rochester Hills, MI (US); Jiyu Zhang, Sterling Heights, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 56 days.

(21) Appl. No.: 16/790,799

(22) Filed: Feb. 14, 2020

(65) Prior Publication Data

US 2021/0256327 A1 Aug. 19, 2021

(51) Int. Cl.
*G06K 9/62* (2006.01)
*G06K 9/00* (2006.01)
*G01V 1/00* (2006.01)
*G06N 3/02* (2006.01)

(52) U.S. Cl.
CPC .......... *G06K 9/6288* (2013.01); *G01V 1/001* (2013.01); *G01V 1/003* (2013.01); *G06K 9/00791* (2013.01); *G06K 9/6277* (2013.01); *G06N 3/02* (2013.01)

(58) Field of Classification Search
None
See application file for complete search history.

(56) References Cited

U.S. PATENT DOCUMENTS

| | | | | |
|---|---|---|---|---|
| 7,561,180 | B2 * | 7/2009 | Koike | B60Q 1/50 348/148 |
| 2007/0286475 | A1 * | 12/2007 | Sekiguchi | G06K 9/00369 382/154 |
| 2013/0177202 | A1 * | 7/2013 | Dierks | G06K 9/3241 382/103 |
| 2019/0047500 | A1 * | 2/2019 | Ghannam | B60R 21/013 |
| 2021/0125494 | A1 * | 4/2021 | Cho | G01S 3/8032 |

OTHER PUBLICATIONS

Islam et al., "Adaptive spatial-temporal resolution optical vehicular communication system using image sensor" International Journal of Distributed Sensor Networks 13.11 (Nov. 2017) 15 pages.

\* cited by examiner

*Primary Examiner* — David Perlman
(74) *Attorney, Agent, or Firm* — Cantor Colburn LLP (57) ABSTRACT

A system and method for determining the presence of a hidden hazard may include identification of an operational scene for a host vehicle, and identification of an operational situation for the host vehicle. Information from a plurality of proximity sensors is collected and classified. A plurality of hidden hazard presence probabilities corresponding to the information from each of the plurality of proximity sensors, the operational scene, the operational situation, and at least one of a comparative process and a dynamic neural network process are estimated. A fusion process may be performed upon the plurality of hidden hazard presence probabilities to determine the presence of a hidden hazard.

20 Claims, 10 Drawing Sheets

HIDDEN HAZARD SITUATIONAL AWARENESS

This disclosure is related to situational awareness in road vehicles.

Vehicle systems are known to monitor the region surrounding the vehicle for improving a driver's situational awareness, for example forward and rear range, range-rate and vision systems. Such systems may be utilized in providing operator alerts and control inputs related to objects, including other vehicles. Such systems may be enablers in autonomous and semi-autonomous vehicle controls, for example adaptive cruise controls, assisted parking, lane keeping and blind spot warnings for adjacent lanes. However, known system capabilities and implementations may be primarily concerned with line of sight detection.

SUMMARY

In one exemplary embodiment, a method for determining the presence of a hidden hazard may include identifying an operational scene for a host vehicle, identifying an operational situation for the host vehicle, collecting and classifying information from a plurality of proximity sensors, estimating a plurality of hidden hazard presence probabilities corresponding to the information from each of the plurality of proximity sensors, the operational scene, the operational situation, and at least one of a comparative process and a dynamic neural network process, and performing a fusion process upon the plurality of hidden hazard presence probabilities to determine the presence of a hidden hazard.

In addition to one or more of the features described herein, collecting and classifying information from a plurality of proximity sensors may include collecting and classifying information from an ambient light sensor, a vision system, an acoustic sensor and a seismic sensor.

In addition to one or more of the features described herein, collecting and classifying information from a plurality of proximity sensors may include collecting and classifying information from at least one of an ambient light sensor and a vision system, and from at least one of an acoustic sensor and a seismic sensor.

In addition to one or more of the features described herein, collecting and classifying information from a plurality of proximity sensors may include collecting ambient light and classifying regions of differing brightness.

In addition to one or more of the features described herein, collecting and classifying information from a plurality of proximity sensors may include collecting ambient light and classifying regions of overlapping headlight patterns from the host vehicle and at least one occluded target vehicle.

In addition to one or more of the features described herein, collecting and classifying information from a plurality of proximity sensors may include collecting images of light beams from a vision system and classifying the images based upon a plurality of predetermined light beam characteristics.

In addition to one or more of the features described herein, collecting and classifying information from a plurality of proximity sensors may include collecting acoustic waveforms and classifying the waveforms based on a plurality of predetermined acoustic characteristics.

In addition to one or more of the features described herein, collecting and classifying information from a plurality of proximity sensors may include collecting seismic waveforms and classifying the waveforms based on a plurality of predetermined seismic characteristics.

In another exemplary embodiment, a system for determining the presence of a hidden hazard may include a host vehicle, a plurality of proximity sensors associated with the host vehicle, and a controller configured to identify an operational scene for the host vehicle, identify an operational situation for the host vehicle, collect and classify information from the plurality of proximity sensors, estimate a plurality of hidden hazard presence probabilities corresponding to the information from each of the plurality of proximity sensors, the operational scene, the operational situation, and at least one of a comparative process and a dynamic neural network process, and perform a fusion process upon the plurality of hidden hazard presence probabilities to determine the presence of a hidden hazard.

In addition to one or more of the features described herein, the controller may be configured to collect and classify information from an ambient light sensor, a vision system, an acoustic sensor and a seismic sensor.

In addition to one or more of the features described herein, the controller may be configured to collect and classify information from at least one of an ambient light sensor and a vision system, and from at least one of an acoustic sensor and a seismic sensor.

In addition to one or more of the features described herein, the controller may be configured to collect ambient light and classify regions of overlapping headlight patterns from the host vehicle and at least one occluded target vehicle.

In addition to one or more of the features described herein, the controller may be configured to collect images of light beams from a vision system and classify the images based upon a plurality of predetermined light beam characteristics.

In addition to one or more of the features described herein, the controller may be configured to collect acoustic waveforms and classify the waveforms based on a plurality of predetermined acoustic characteristics.

In addition to one or more of the features described herein, the controller may be configured to collect seismic waveforms and classify the waveforms based on a plurality of predetermined seismic characteristics.

In yet another exemplary embodiment, a system for determining the presence of a hidden hazard may include a host vehicle, and a plurality of proximity sensors associated with the host vehicle including an ambient light sensor, a vision system, an acoustic sensor and a seismic sensor. The system may further include a controller configured to identify an operational scene for the host vehicle based on information including information corresponding to current geographic location of the host vehicle, identify an operational situation for the host vehicle based on information including information corresponding to dynamic conditions within the operational scene, collect and classify information from the plurality of proximity sensors, estimate a plurality of hidden hazard presence probabilities corresponding to the information from each of the plurality of proximity sensors, the operational scene, the operational situation, and at least one of a comparative process and a dynamic neural network process, and perform a fusion process upon the plurality of hidden hazard presence probabilities to determine the presence of a hidden hazard.

In addition to one or more of the features described herein, the comparative process may include retrieval of rules corresponding to the operational scene and operational situation defining overlap and non-overlap zones within a headlight pattern of the host vehicle, establishing brightness comparatives for the zones, and comparing the brightness comparatives to collected and classified regions of overlapping light within the headlight pattern of the host vehicle.

In addition to one or more of the features described herein, the comparative process may include retrieval of typical light beam images from hidden target vehicles corresponding to the operational scene and operational situation, and comparing the images to collected and classified vision system images.

In addition to one or more of the features described herein, the comparative process may include retrieval of acoustic signatures corresponding to the operational scene and operational situation, and comparing the signatures to collected and classified acoustic waveforms.

In addition to one or more of the features described herein, the comparative process may include retrieval of seismic signatures corresponding to the operational scene and operational situation, and comparing the signatures to collected and classified seismic waveforms.

The above features and advantages, and other features and advantages of the disclosure are readily apparent from the following detailed description when taken in connection with the accompanying drawings.

BRIEF DESCRIPTION OF THE DRAWINGS

Other features, advantages, and details appear, by way of example only, in the following detailed description, the detailed description referring to the drawings in which.

DETAILED DESCRIPTION

The following description is merely exemplary in nature and is not intended to limit the present disclosure, its application or uses. Throughout the drawings, corresponding reference numerals indicate like or corresponding parts and features. As used herein, control module, module, control, controller, control unit, electronic control unit, processor and similar terms mean any one or various combinations of one or more of Application Specific Integrated Circuit(s) (ASIC), electronic circuit(s), central processing unit(s) (preferably microprocessor(s)) and associated memory and storage (read only memory (ROM), random access memory (RAM), electrically programmable read only memory (EPROM), hard drive, etc.) or microcontrollers executing one or more software or firmware programs or routines, combinational logic circuit(s), input/output circuitry and devices (I/O) and appropriate signal conditioning and buffer circuitry, high speed clock, analog to digital (A/D) and digital to analog (D/A) circuitry and other components to provide the described functionality. A control module may include a variety of communication interfaces including point-to-point or discrete lines and wired or wireless interfaces to networks including wide and local area networks, on vehicle controller area networks and in-plant and service-related networks. Functions of the control module as set forth in this disclosure may be performed in a distributed control architecture among several networked control modules. Software, firmware, programs, instructions, routines, code, algorithms and similar terms mean any controller executable instruction sets including calibrations, data structures, and look-up tables. A control module has a set of control routines executed to provide described functions. Routines are executed, such as by a central processing unit, and are operable to monitor inputs from sensing devices and other networked control modules and execute control and diagnostic routines to control operation of actuators. Routines may be executed at regular intervals during ongoing engine and vehicle operation. Alternatively, routines may be executed in response to occurrence of an event, software calls, or on demand via user interface inputs or requests.

During roadway operation of a vehicle by a vehicle operator, semi-autonomously or fully-autonomously, the vehicle may be an observer in an operational scene and situation. An operational scene (scene) is generally understood to include the substantially static driving environment including, for example, the roadway and surrounding infrastructure, whereas an operational situation (situation) is generally understood to include substantially kinetic, dynamic and temporal conditions within the scene such as, for example, other vehicles on the roadway, objects and hazards. An observing vehicle may be referred to herein as a host vehicle. Other vehicles sharing the roadway may be referred to herein as target vehicles.

Figure 1:
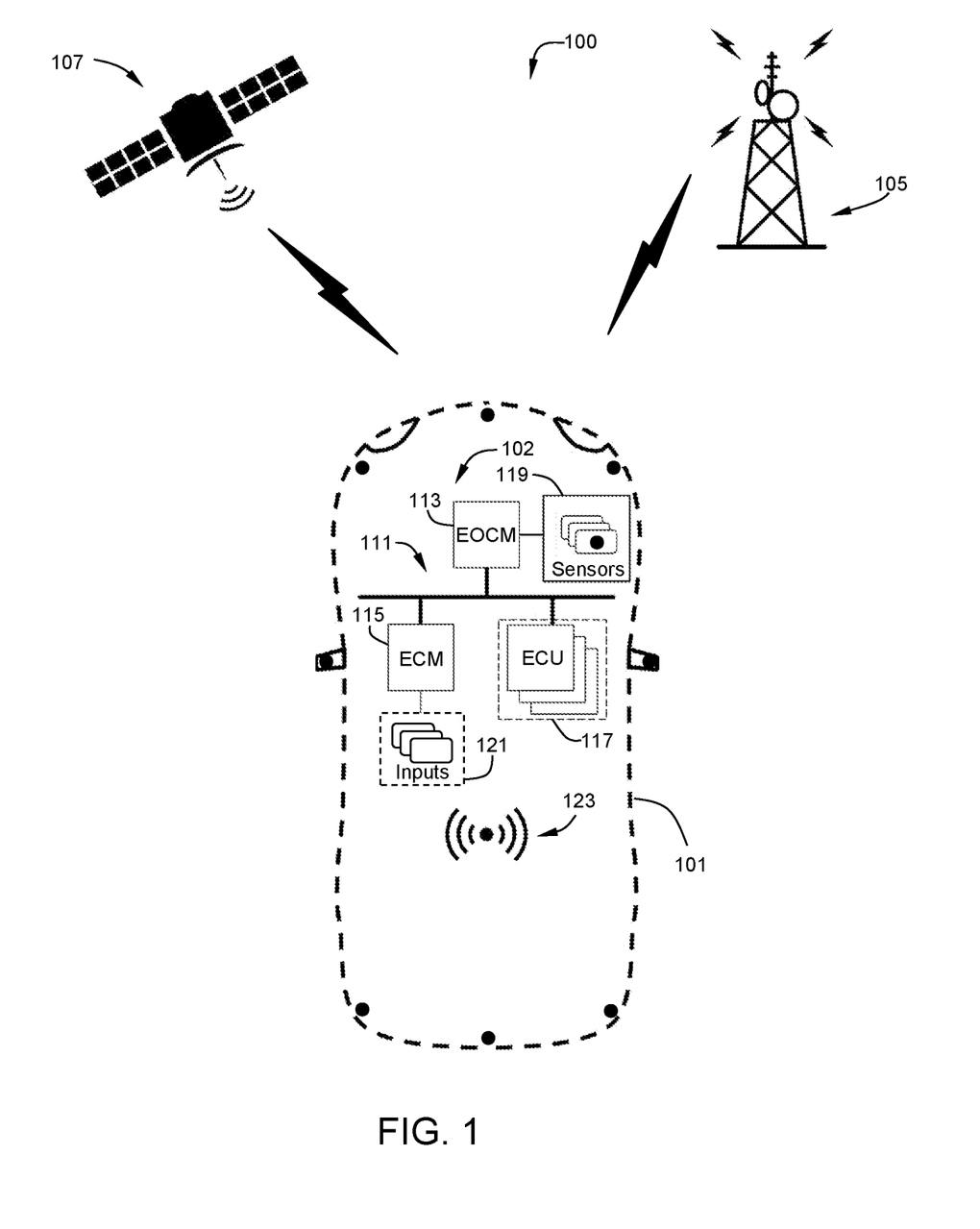
FIG. 1 illustrates an exemplary system for hidden hazard situational awareness, in accordance with the present disclosure.

A host vehicle may be equipped with various sensors and communication hardware and systems. An exemplary host vehicle 101 is shown in FIG. 1 which illustrates an exemplary system 100 for hidden hazard situational awareness, in accordance with the present disclosure. Host vehicle 101 may include a control system 102 including a plurality of networked electronic control units (ECUs) which may be communicatively coupled via a bus structure 111 to perform control functions and information sharing, including executing control routines locally or in distributed fashion. Bus structure 111 may be a part of a Controller Area Network (CAN), or other similar network, as well known to those having ordinary skill in the art. One exemplary ECU may include an engine control module (ECM) 115 primarily performing functions related to internal combustion engine monitoring, control and diagnostics based upon a plurality of inputs 121. While inputs 121 are illustrated as coupled directly to ECM 115, the inputs may be provided to or determined within ECM 115 from a variety of well-known sensors, calculations, derivations, synthesis, other ECUs and sensors over the bus structure 111 as well understood by those having ordinary skill in the art. One having ordinary skill in the art recognizes that a plurality of other ECUs 117 may be part of the network of controllers onboard the host vehicle 101 and may perform other functions related to various other vehicle systems (e.g. chassis, steering, braking, transmission, communications, infotainment, etc.). A variety of vehicle related information may be commonly available and accessible to all networked ECUs, for example, vehicle dynamics information such as speed, heading, steering angle, multi-axis accelerations, yaw, pitch, roll, etc.

Another exemplary ECU may include an external object calculation module (EOCM) 113 primarily performing functions related to sensing the environment external to the vehicle 101 and, more particularly, related to roadway lane, pavement and object sensing. EOCM 113 receives information from a variety of sensors 119 and other sources. By way of example only and not of limitation, EOCM 113 may receive information from one or more radar system, lidar system, ultrasonic system, vision system (e.g. camera), global positioning system (GPS), vehicle-to-vehicle communication system, and vehicle-to-infrastructure communication systems, as well as from on or off board databases, for example map, road segment, navigation and infrastructure information as well as crowd sourced information. GPS and database information may provide a majority of the driving scene information, whereas the variety of sensors 119 may provide a majority of the driving situation information. EOCM 113 may have access to host vehicle position and velocity data, line of sight target vehicle range and rate data, and image based data which may be useful in the determination or validation of roadway and target vehicle information, for example, roadway feature and target vehicle geometric, distance and velocity information, among others. However, many such sensing systems are limited in utility, or have been limited in application, to objects, including other vehicles, within a non-occluded line of sight. In accordance with the present disclosure, certain other sensing technologies may be employed to improve situational awareness of hidden hazards, for example ambient light sensors, acoustic sensors, and seismic sensors. As well, vision systems may be adapted in accordance with the present disclosure to improve situational awareness of hidden hazards. Therefore, it is understood that certain sensors may be considered line of sight (LOS) sensors in the sense that they rely on direct detection of objects within the scene and rely primarily upon a non-occluded line of sight between the sensor and the detected object. Examples of such LOS sensors include, for example, radar, lidar, ultrasonic and vision sensors. In contrast, it is also understood that certain sensors may be considered proximity sensors in the sense that they rely on indirect detection of objects not within line of sight between the sensor and the detected object. Such proximity sensors detect influences or excitations within the scene which may be processed to inferentially determine the presence of the object source of the influences or excitations. Examples of such proximity sensors include, for example, ambient light sensors, acoustic sensors, seismic sensors and vision sensors. Sensors 119 may be positioned at various perimeter points around the vehicle including front, rear, corners, sides etc. as shown in the vehicle 101 by large dots at those positions. Other positioning of sensors is envisioned and may include forward-looking sensors through the vehicle windshield, for example mounted in front of a rear-view mirror or integrated within such a mirror assembly. Sensor 119 positioning may be selected as appropriate for providing the desired coverage for particular applications. For example, front and front corner positioning, and otherwise front facing of sensors 119 may be more preferred with respect to improve situational awareness of hidden hazards during forward travel, in accordance with the present disclosure. It is recognized, however, that analogous placement at the rear or rear facing of sensors 119 may be more preferred with respect to improve situational awareness of hidden hazards during reverse travel, in accordance with the present disclosure. Certain of the sensors, for example, seismic sensors may not be primarily sensitive to directional information and therefore their placement may not be positionally critical. Seismic sensors may be mounted to the host vehicle's sprung or unsprung mass. In one embodiment, seismic sensors may be integrated into the unsprung mass of the chassis at one or more tire pressure monitors (TPM) associated with each wheel. Known TPMs may be incorporated at one end of a tire valve stem on the interior of the wheel or attached to the opposite end of the valve stem where the valve stem cap is conventionally attached. Known TPMs advantageously employ low power radio frequency communication of information to the associated vehicle. TPM systems are known to use remote keyless entry (RKE) system controllers for receiving TPM signals. One skilled in the art therefore may readily adapt known TPMs for communicating seismic information to the host vehicle to improve situational awareness of hidden hazards, in accordance with the present disclosure. While sensors 119 are illustrated as coupled directly to EOCM 113, the inputs may be provided to EOCM 113 over the bus structure 111 as well understood by those having ordinary skill in the art. Host vehicle 101 may be equipped with radio communication capabilities shown generally at 123 and more particularly related to GPS satellite 107 communications, vehicle-to-vehicle (V2V) communications, and vehicle-to-infrastructure (V2I) communications such as with terrestrial radio towers 105. The description herein of the exemplary system 100 for hidden hazard situational awareness is not intended to be exhaustive. Nor is the description of the various exemplary system to be interpreted as being wholly required. Thus, one having ordinary skill in the art will understand that some, all, and additional technologies from the described exemplary system 100 may be used in various implementations of hidden hazard situational awareness in accordance with the present disclosure.

Figure 2:
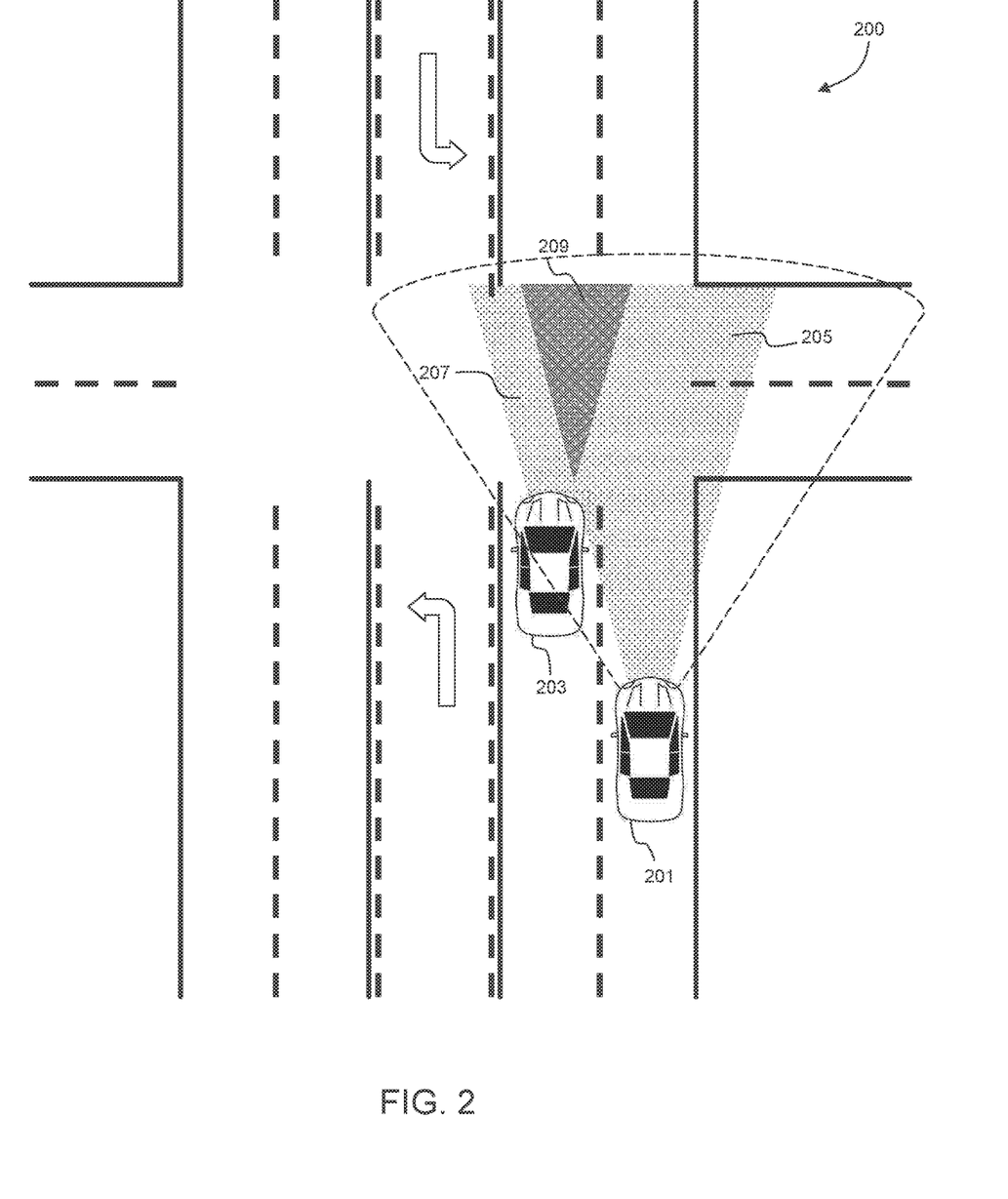
FIG. 2 shows an exemplary vehicle operating scene illustrating no hidden hazard, in accordance with the present disclosure.

FIGS. 2-9 show a variety of exemplary vehicle operating scenes in accordance with the present disclosure. In the scene 200 of FIG. 2, a host vehicle 201 and a first target vehicle 203 may be traveling in the same direction in different lanes of a roadway. Both vehicles may be operating with headlights on. Both vehicles have a respective headlight illumination pattern substantially forward in the respective direction of travel. Further, both vehicles may be traveling close enough for their respective headlight patterns to be overlapping a region 209 which is brighter than non-overlapped regions 205, 207. In FIG. 2, region 205 is primarily illuminated by the host vehicle 201 headlights, whereas region 207 is primarily illuminated by the first target vehicle 203 headlights. In accordance with the present disclosure, the illumination regions 205 and 209 may be discernable by the host vehicle's forward-looking sensor(s), for example by one or more of a vision system and ambient light sensor. The host vehicle 201 may differentiate the region 209 from region 205 and recognize region 209 to be brighter due to a contributory, additive light source within the headlight illumination pattern region of the host vehicle.

The host vehicle 201 may also discern the presence and position of the first target vehicle 203 and attribute the additive light source to the first target vehicle's headlight system.

Figure 3:
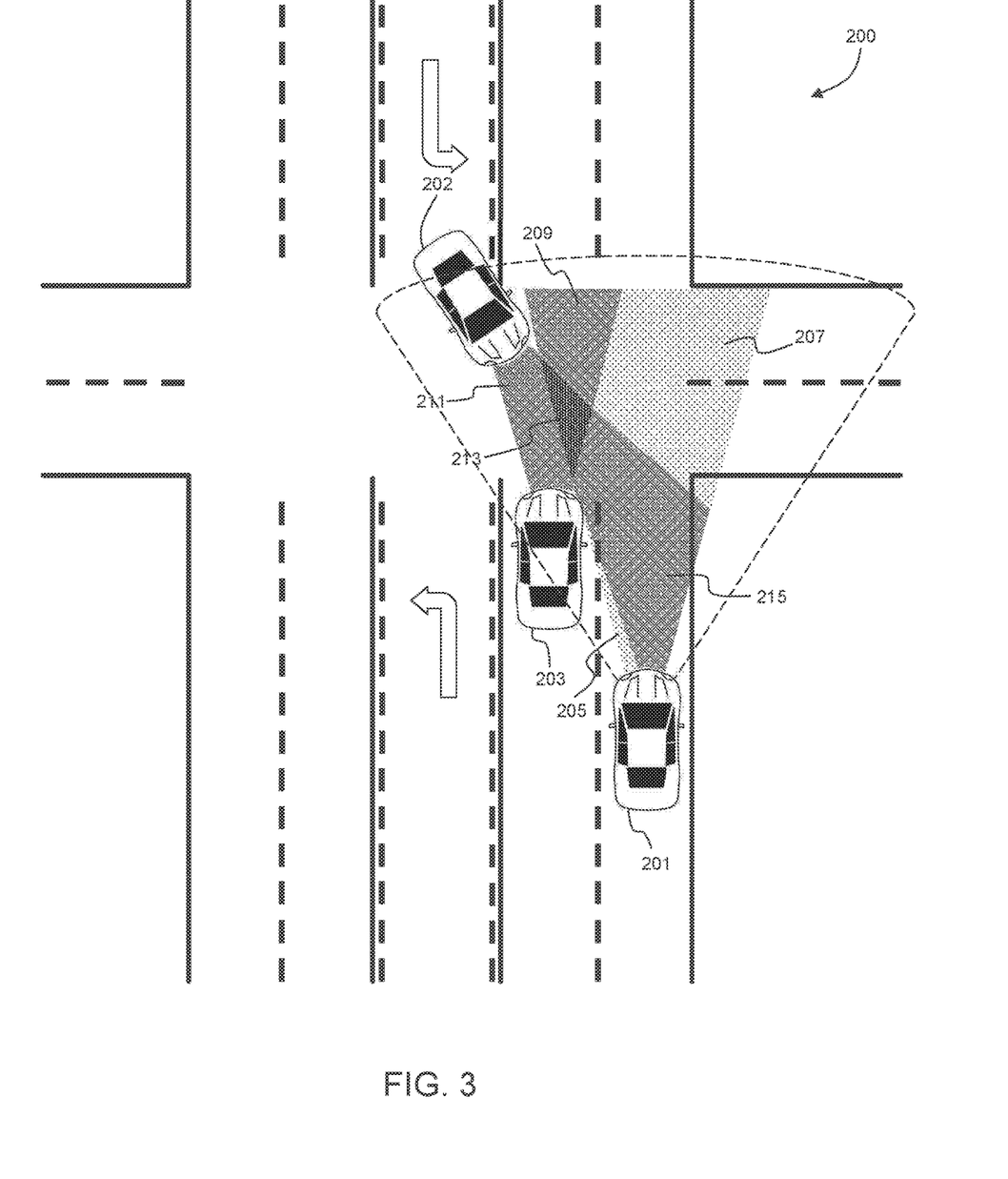
FIG. 3 shows an exemplary vehicle operating scene illustrating an exemplary hidden hazard, in accordance with the present disclosure.

FIG. 3 shows the same scene 200 and situation with respect to host vehicle 201 and first target vehicle 203. FIG. 3 additionally illustrates a second target vehicle 202 that is shown traveling in the opposite direction within a left turn lane and angled in approach to crossing the travel lanes of the host and first target vehicles, 201 and 203, respectively. Second target vehicle 202 may be hidden from line of sight of the operator of host vehicle 201, second target vehicle being occluded from view by intervening first target vehicle 203. The second target vehicle 202 may also be operating with headlights on. All vehicles have a respective headlight illumination pattern substantially forward in the respective direction of travel. Further, all vehicles may be traveling close enough for their respective headlight patterns to be overlapping certain regions. In the scenario of FIG. 3, region 215 may be overlapped by host vehicle 201 and second target vehicle 202 headlight patterns, region 209 may be overlapped by host vehicle 201 and first target vehicle 203 headlight patterns, region 211 may be overlapped by first target vehicle 203 and second target vehicle 202 headlight pattern, region 213 may be overlapped by host vehicle 201, first target vehicle 203, and second target vehicle 202 headlight patterns. Regions 205, 207 may be primarily illuminated by host vehicle 201 headlight pattern. In accordance with the present disclosure, the illumination regions 205, 207, 215, 213 and 209 may be discernable by the host vehicle's forward-looking sensor(s), for example by one or more of a vision system and ambient light sensor. The host vehicle 201 may differentiate these regions by brightness and recognize regions 209, 213 and 215 to be brighter than regions 205, 207 due to a contributory, additive light source within the headlight illumination pattern region of the host vehicle 201. Likewise, the host vehicle 201 may recognize region 213 to be brighter than regions 205, 215 and 209 due to a contributory, additive light source within the headlight illumination pattern region of the host vehicle. The host vehicle 201 may discern the presence and position of the first target vehicle 203 and attribute the additive light source of region 209 to the first target vehicle 201 headlight system. The host vehicle 201 may infer that the additive light sources in region 213 and 215 are due to a hidden target vehicle (second target vehicle 202) based upon the scene and situation information.

Figure 4:
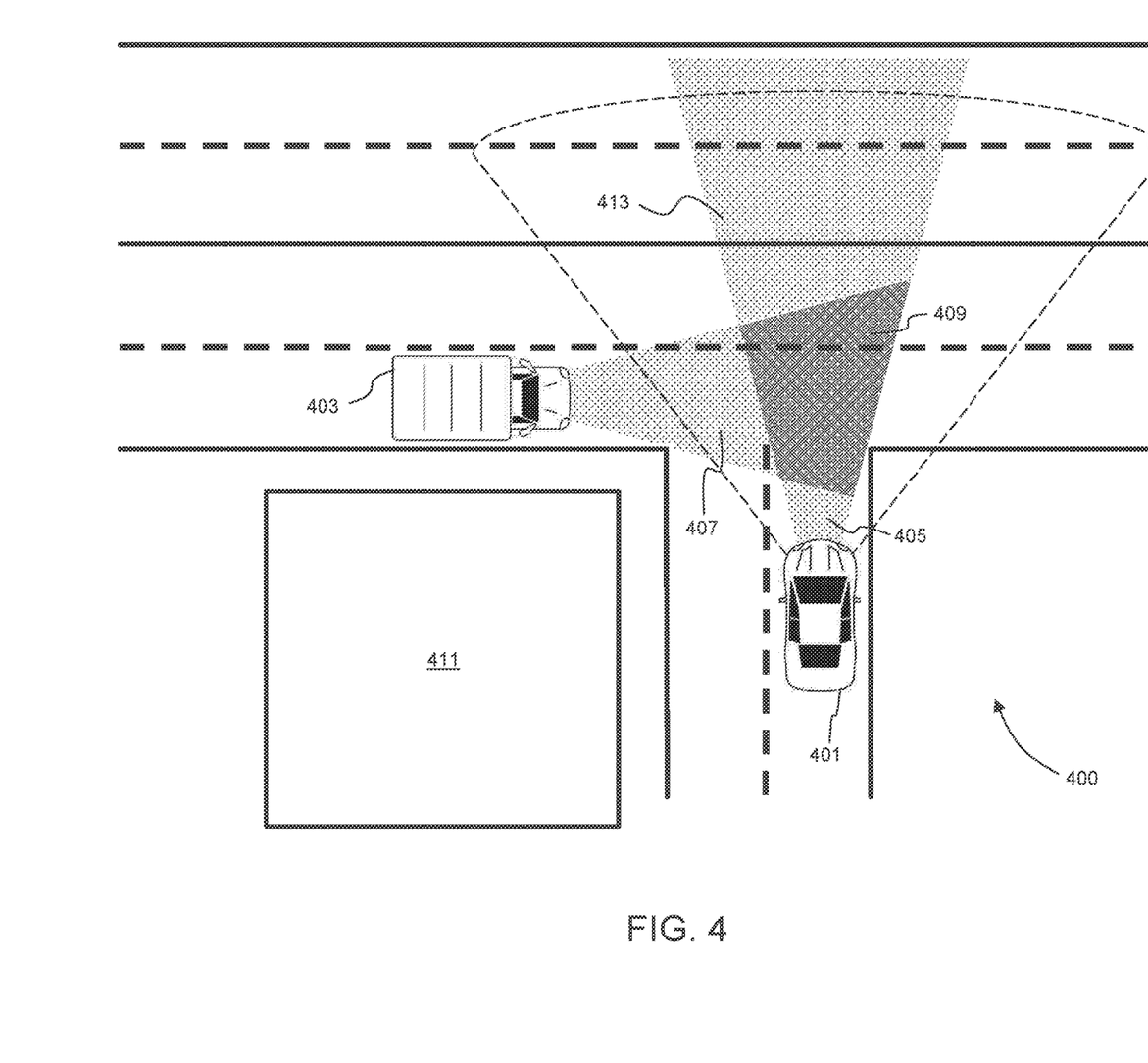
FIG. 4 shows an exemplary vehicle operating scene illustrating an exemplary hidden hazard, in accordance with the present disclosure.

Similarly, FIG. 4 shows an alternate scene 400 and situation with respect to host vehicle 401 and first target vehicle 403. FIG. 4 illustrates first target vehicle 403 traveling in the right lane of the respective roadway. First target vehicle 403 may be occluded from the view of host vehicle 401 by building 411. In one embodiment, both vehicles may be operating with headlights on. In an alternate embodiment, only the occluded target vehicle 403 may be operating with headlights on. Both vehicles are illustrated having a respective headlight illumination pattern substantially forward in the respective direction of travel. Further, both vehicles may be traveling close enough for their respective headlight patterns to be overlapping a region 409 which is brighter than non-overlapped regions 405, 407 and 413. In the embodiment wherein only the target vehicle 403 is operating with headlights on, only the illumination pattern from the target vehicle 403 will be projected. In FIG. 4, regions 405, 413 are primarily illuminated by the host vehicle 401 headlights, whereas region 407 is primarily illuminated by the first target vehicle 403 headlights. In accordance with the present disclosure, the illumination regions 405, 407, 413 and 409 may be discernable by the host vehicle 401 forward-looking sensor(s), for example by one or more of a vision system and ambient light sensor. The host vehicle 401 may differentiate the region 409 from regions 405, 407 and 413 and recognize region 409 to be brighter due to a contributory, additive light source within the headlight illumination pattern region of the host vehicle 401. The host vehicle 401 may infer that the additive light source of region 409 and the light source of region 407 are due to a hidden target vehicle (first target vehicle 403) based upon the scene and situation information. In the alternative embodiment wherein only the target vehicle 403 is operating with headlights on, the region illuminated by the target vehicle 403 headlights may be discernable by the host vehicle 401 forward-looking sensor(s), for example by one or more of a vision system and ambient light sensor. The host vehicle 401 may differentiate the headlight illuminated region ahead of the target vehicle 403 from other regions and recognize the headlight illuminated region to be brighter due to the headlight illumination pattern of the target vehicle. The host vehicle 401 may infer that the additive light source of the headlight illuminated region is due to a hidden target vehicle (first target vehicle 403) based upon the scene and situation information. In both embodiments, the host vehicle 401 may discern regions of additive light or regions of differing light brightness.

Figure 5:
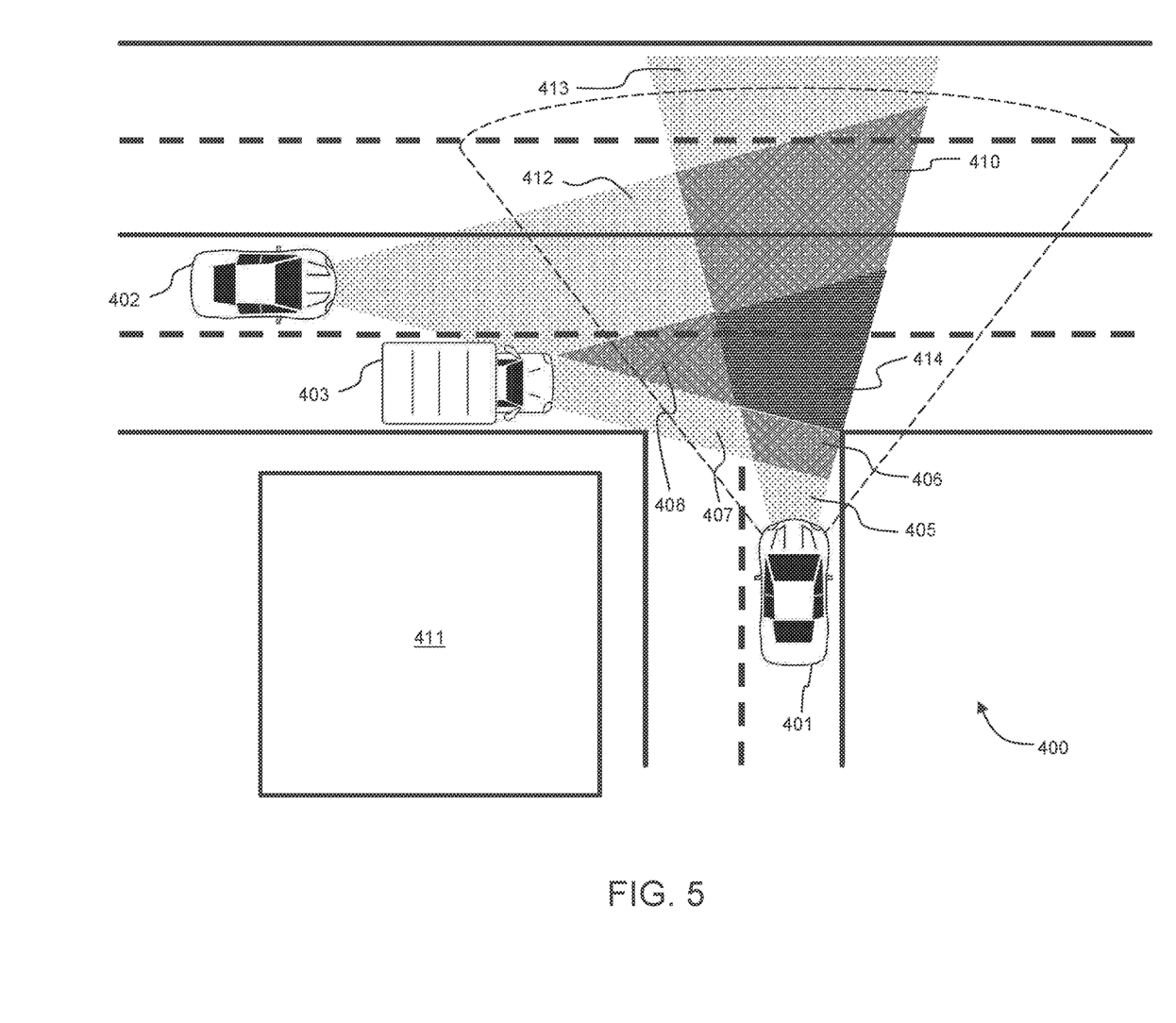
FIG. 5 shows an exemplary vehicle operating scene illustrating exemplary hidden hazards, in accordance with the present disclosure.

FIG. 5 shows the same scene 400 and situation with respect to host vehicle 401 and first target vehicle 403. FIG. 5 additionally illustrates a second target vehicle 402 traveling in the same direction as the first target vehicle 403 in the left lane of the respective roadway. Second target vehicle 402 may be hidden from line of sight of the operator of host vehicle 401, second target vehicle being occluded from view by intervening first target vehicle 403 or both first target vehicle 403 and building 411. The second target vehicle 402 may also be operating with headlights on. All vehicles have a respective headlight illumination pattern substantially forward in the respective direction of travel. Further, all vehicles may be traveling close enough for their respective headlight patterns to be overlapping certain regions. In the scenario of FIG. 5, region 410 may be overlapped by host vehicle 401 and second target vehicle 402 headlight patterns, region 406 may be overlapped by host vehicle 401 and first target vehicle 403 headlight patterns, region 408 may be overlapped by first target vehicle 403 and second target vehicle 402 headlight patterns, region 414 may be overlapped by host vehicle 401, first target vehicle 403, and second target vehicle 402 headlight patterns. Regions 405 and 413 may be primarily illuminated by host vehicle 401 headlight pattern, region 407 may be primarily illuminated by first target vehicle 403 headlight pattern, and region 412 may be primarily illuminated by second target vehicle 402 headlight pattern. In accordance with the present disclosure, the illumination regions 405, 406, 407, 408, 410, 412, 413 and 414 may be discernable by the host vehicle 401 forward-looking sensor(s), for example by one or more of a vision system and ambient light sensor. The host vehicle 401 may differentiate these regions by brightness and recognize regions 406, 408 and 410 to be brighter than region 405, 407, 412 and 413 due to a contributory, additive light source within the headlight illumination pattern region of the host vehicle 401. Likewise, the host vehicle 401 may recognize region 414 to be brighter than regions 406, 408 and 410 due to contributory, additive light sources within the headlight illumination pattern region of the host vehicle. The host vehicle 401 may also at some point as the situation progresses (e.g. one or both of the host vehicle 401 and the first target vehicle 403 processing forward) discern the presence and position of first target vehicle 403 and attribute the additive light source of region 406 to the first target vehicle's headlight system. The host vehicle 401 may infer that the additive light sources in regions 414 and 408 are due to a hidden target vehicle (second target vehicle 402) based upon the scene and situation information.

Figure 6:
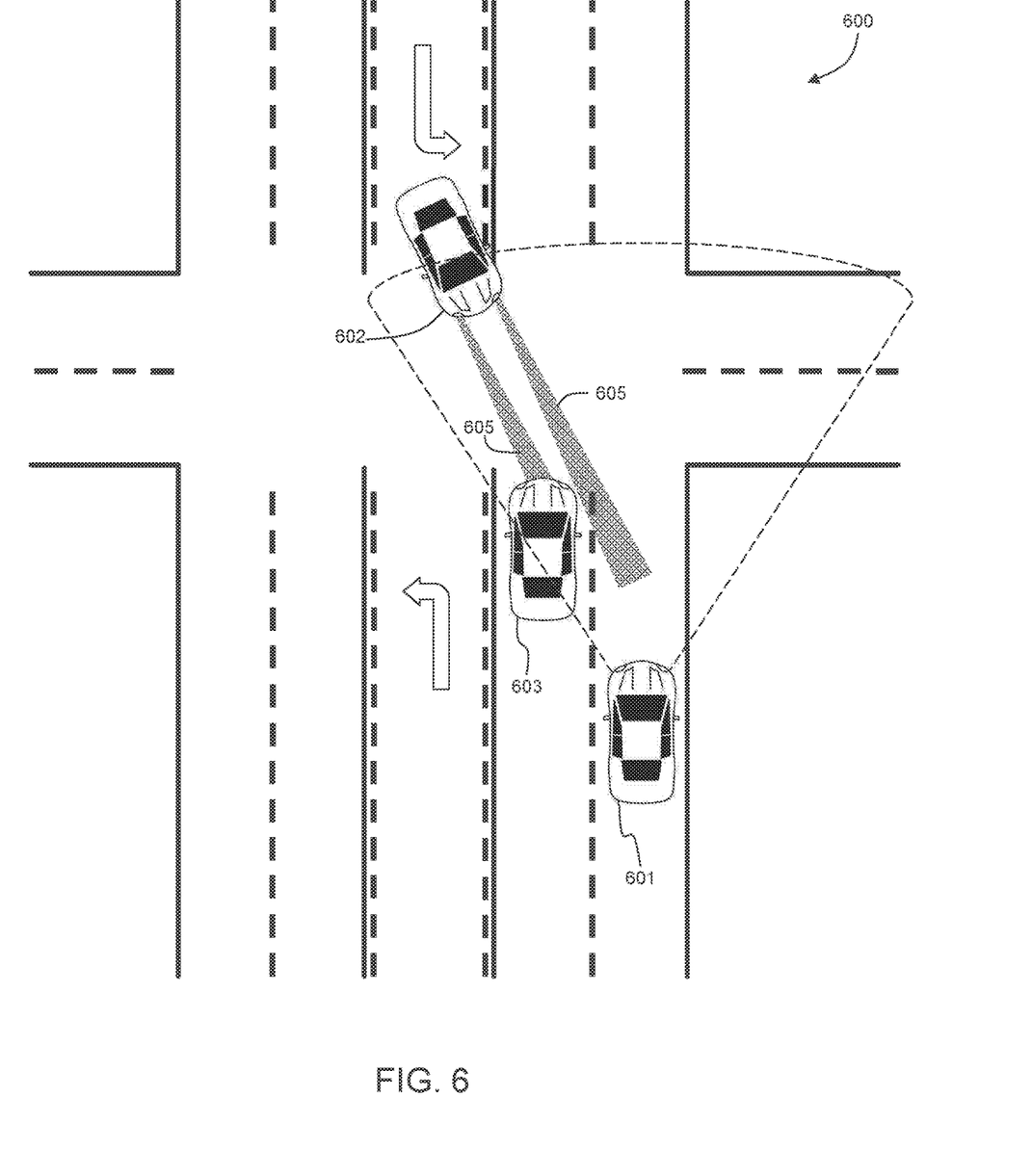
FIG. 6 shows an exemplary vehicle operating scene illustrating an exemplary hidden hazard, in accordance with the present disclosure.

FIG. 6 shows a scene 600 and situation with respect to host vehicle 601, first target vehicle 603 and second target vehicle 602. Host vehicle 601 and first target vehicle 603 may be traveling in the same direction in different lanes of a roadway. Second target vehicle 602 may be traveling in the opposite direction within a left turn lane and angled in approach to crossing the travel lanes of the host and first target vehicles, 601 and 603, respectively. Second target vehicle 602 may be hidden from line of sight of the operator of host vehicle 601, second target vehicle being occluded from view by intervening first target vehicle 603. The second target vehicle 602 may be operating with headlights on. The headlights of second target vehicle 602 may produce relatively compact beams 605 which precede the second target vehicle and project in a region which precedes the host vehicle 601. In accordance with the present disclosure, one or both beams 605 may be discernable by the host vehicle's forward-looking sensor(s), for example by a vision system. The host vehicle 601 may differentiate beams 605 from other light sources which may appear within the scene 600. The host vehicle 601 may discern the presence and position of the first target vehicle 603 and attribute the one or more beams 605 to a hidden target vehicle (second target vehicle 602) and infer the second target vehicle 602 based upon the scene and situation information.

Figure 7:
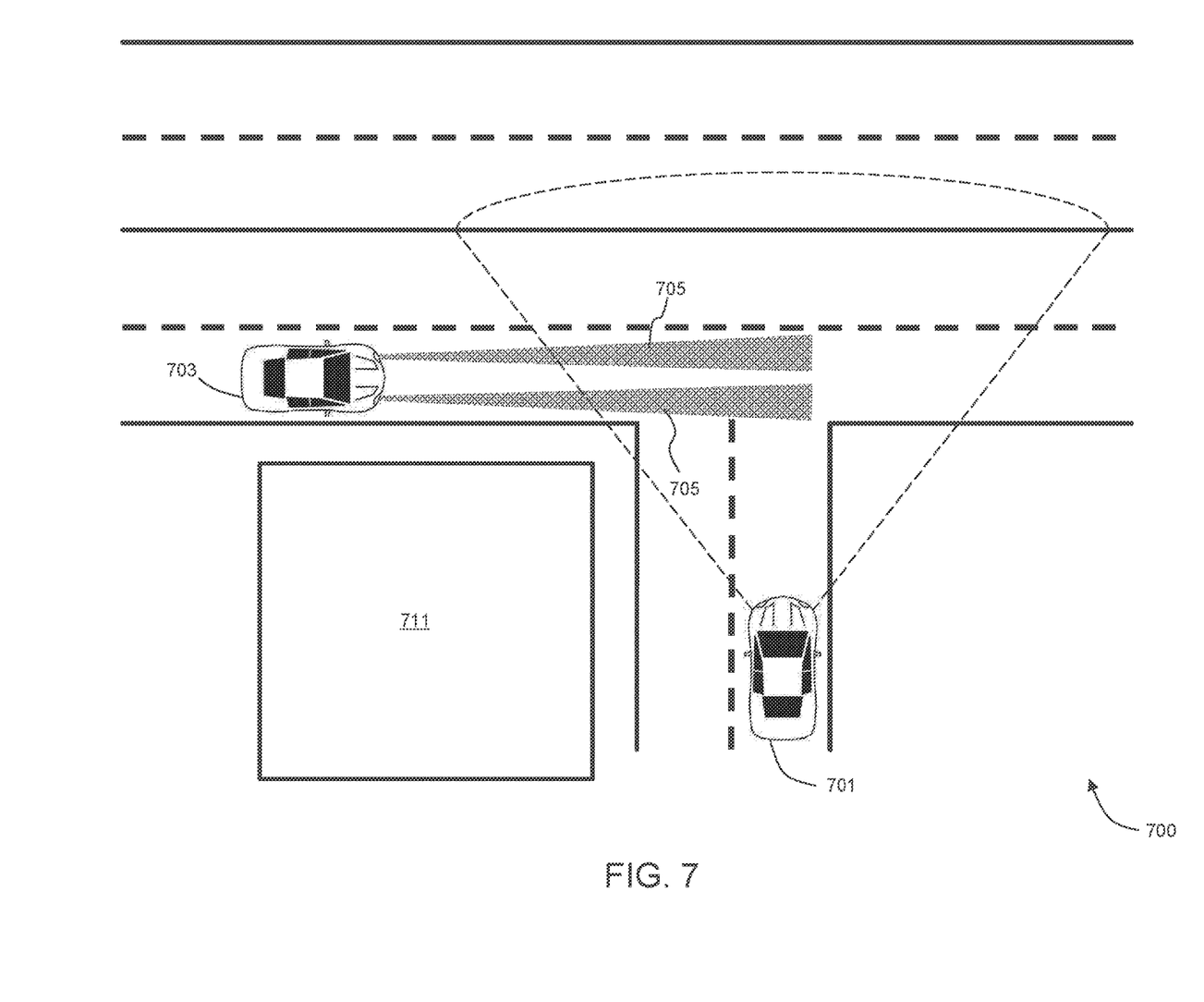
FIG. 7 shows an exemplary vehicle operating scene illustrating an exemplary hidden hazard, in accordance with the present disclosure.

Similarly, FIG. 7 shows an alternate scene 700 and situation with respect to host vehicle 701 and first target vehicle 703. FIG. 7 illustrates first target vehicle 703 traveling in the right lane of the respective roadway. First target vehicle 703 may be occluded from the view of host vehicle 701 by building 711. The first target vehicle 703 may be operating with headlights on. The headlights of first target vehicle 703 may produce relatively compact beams 705 which precede the first target vehicle and project in a region which precedes the host vehicle 701. In accordance with the present disclosure, one or both beams 705 may be discernable by the host vehicle's forward-looking sensor(s), for example by a vision system. The host vehicle 701 may differentiate beams 705 from other light sources which may appear within the scene 700. The host vehicle 701 may discern the presence and position of the first target vehicle 703 and attribute the one or more beams 705 to a hidden target vehicle (first target vehicle 703) and infer the first target vehicle 703 based upon the scene and situation information.

Figure 8:
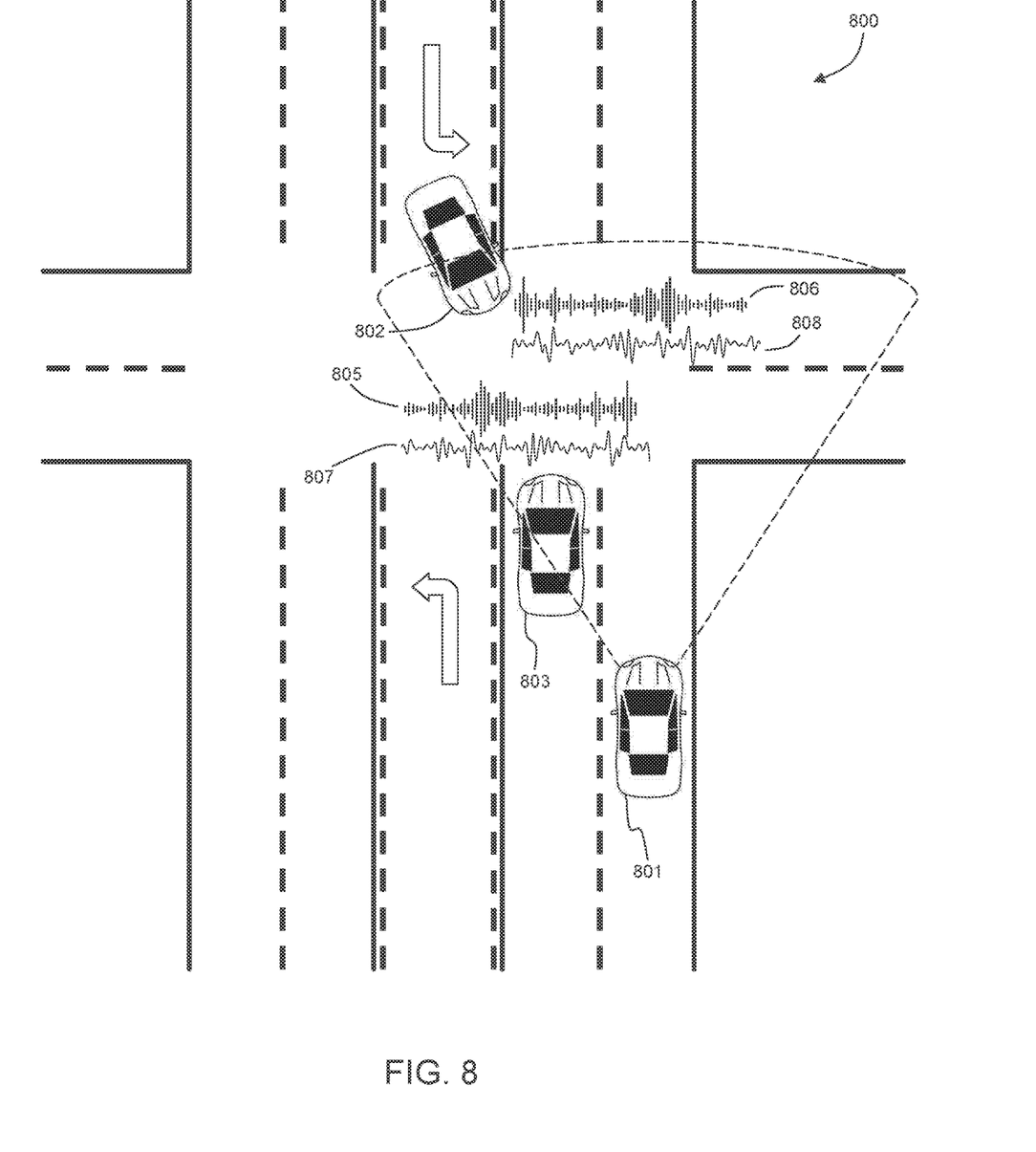
FIG. 8 shows an exemplary vehicle operating scene illustrating an exemplary hidden hazard, in accordance with the present disclosure.

FIG. 8 shows a scene 800 and situation with respect to host vehicle 801, first target vehicle 803 and second target vehicle 802. Host vehicle 801 and first target vehicle 803 may be traveling in the same direction in different lanes of a roadway. Second target vehicle 802 may be traveling in the opposite direction within a left turn lane and angled in approach to crossing the travel lanes of the host and first target vehicles, 801 and 803, respectively. Second target vehicle 802 may be hidden from line of sight of the operator of host vehicle 801, second target vehicle being occluded from view by intervening first target vehicle 803. The second target vehicle 802 may be producing an audible waveform 808, for example from its powertrain and road noise. Additionally, the second target vehicle 802 may excite a seismic waveform 806 from its kinetic contact with the road surface. The first target vehicle 803 may similarly be producing an audible waveform 807 and exciting a seismic waveform 805. In accordance with the present disclosure, the audible and seismic waveforms may be discernable by the host vehicle's acoustic sensors and seismic sensors, respectively. The host vehicle 801 may differentiate the sonic waveform 808 of the second target vehicle 802 from other audible noise (including the sonic waveform 807 of the first target vehicle 803) which may appear within the scene 800. The host vehicle 801 may differentiate the seismic waveforms from other seismic noise (including the seismic waveform 805 of the first target vehicle 803) which may appear within the scene 800. The host vehicle 801 may discern the presence and position of the first target vehicle 803 and attribute the sonic waveform 808 and/or the seismic waveform 806 to a hidden target vehicle (second target vehicle 802) and infer the second target vehicle 802 based upon the scene and situation information.

Figure 9:
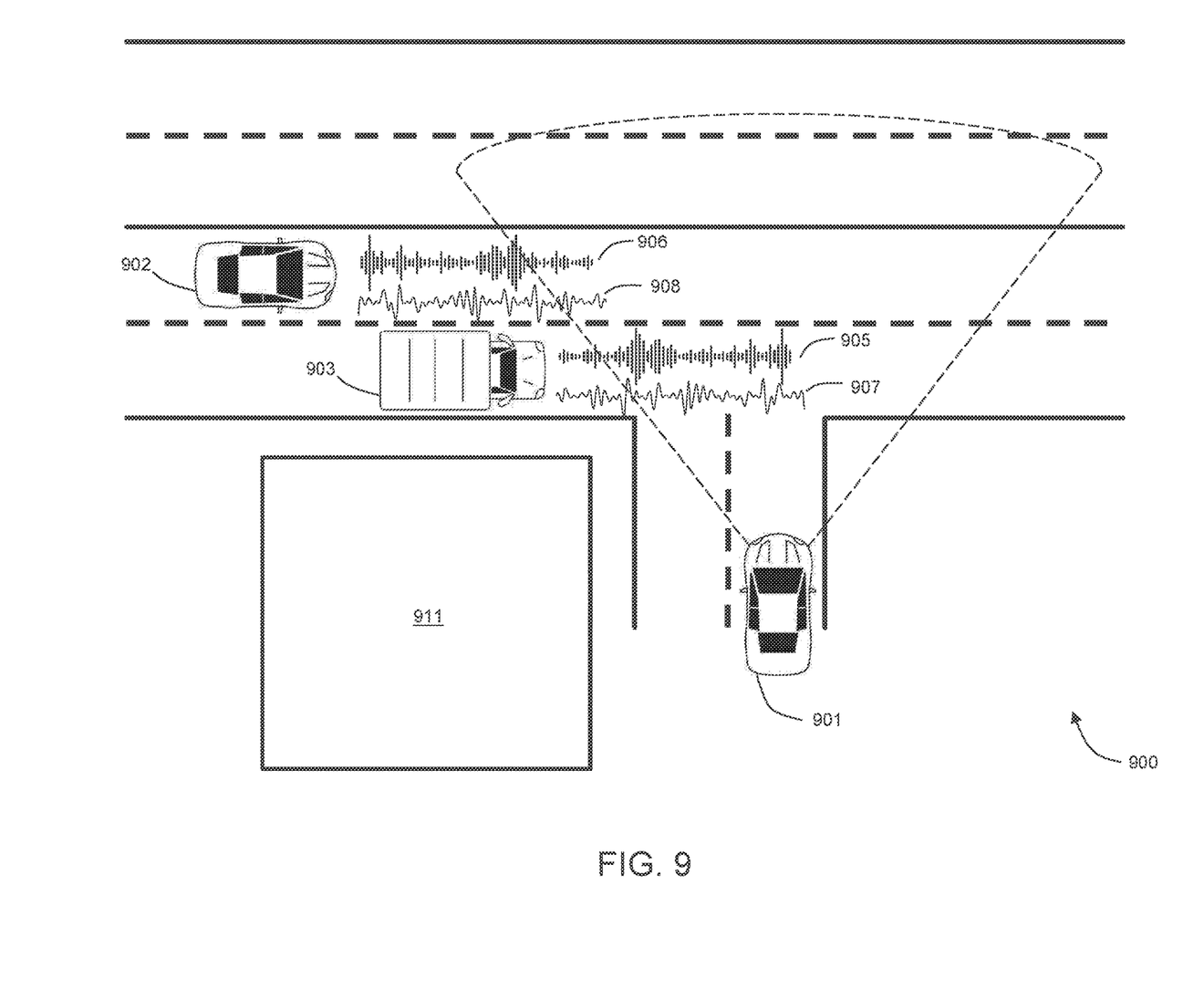
FIG. 9 shows an exemplary vehicle operating scene illustrating exemplary hidden hazards, in accordance with the present disclosure.

Similarly, FIG. 9 shows an alternate scene 900 and situation with respect to host vehicle 901, first target vehicle 903 and second target vehicle 902. FIG. 9 illustrates first target vehicle 903 traveling in the right lane of the respective roadway and second target vehicle travelling in the same direction in the left lane of the respective roadway. Second target vehicle 902 may be hidden from line of sight of the operator of host vehicle 901, second target vehicle being occluded from view by intervening first target vehicle 903 or both first target vehicle 903 and building 911. The second target vehicle 902 may be producing an audible waveform 908, for example from its powertrain and road noise. Additionally, the second target vehicle 902 may excite a seismic waveform 906 from its kinetic contact with the road surface. The first target vehicle 903 may similarly be producing an audible waveform 907 and exciting a seismic waveform 905. In accordance with the present disclosure, the audible and seismic waveforms may be discernable by the host vehicle's acoustic sensors and seismic sensors, respectively. The host vehicle 901 may differentiate the sonic waveform 908 of the second target vehicle 902 from other audible noise (including the sonic waveform 907 of the first target vehicle 903) which may appear within the scene 900. The host vehicle 901 may differentiate the seismic waveforms from other seismic noise (including the seismic waveform 905 of the first target vehicle 903) which may appear within the scene 900. The host vehicle 901 may discern the presence and position of the first target vehicle 903 and attribute the sonic waveform 908 and/or the seismic waveform 906 to a hidden target vehicle (second target vehicle 902) and infer the second target vehicle 902 based upon the scene and situation information.

Figure 10:
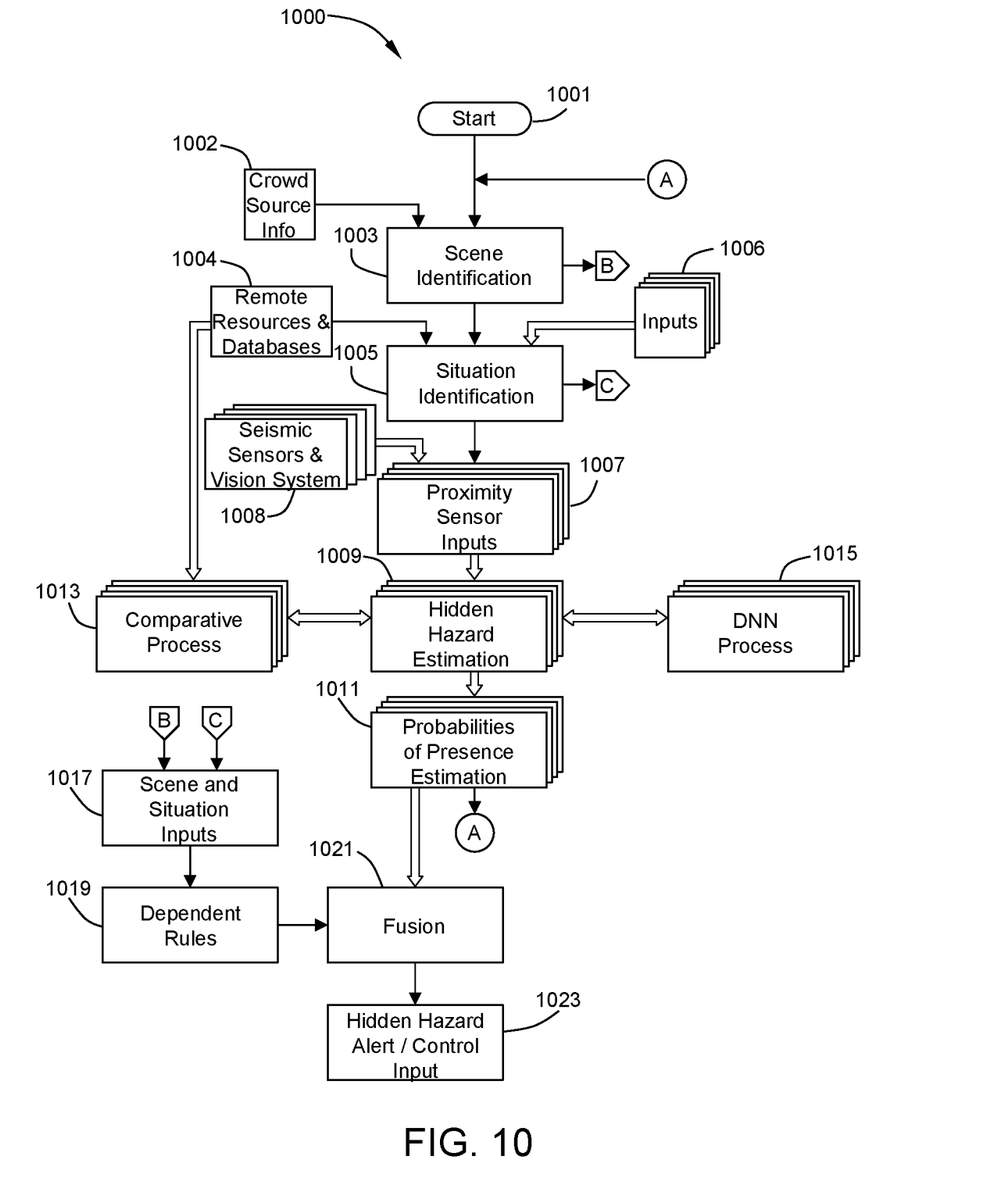
FIG. 10 shows an exemplary process for estimating hidden hazards, in accordance with the present disclosure.

FIG. 10 shows an exemplary process 1000 for estimating hidden hazards, in accordance with the present disclosure. The process begins at 1001, for example subsequent to satisfaction of entry conditions such as vehicle ignition. At 1003, scene identification occurs and may include references to GPS, map, road segment, navigation, infrastructure, and crowd sourced information 1002 corresponding to current geographic location of the host vehicle. At 1005, situation identification occurs and may include references to target vehicles on the roadway, objects, and hazards, from vehicle sensor inputs 1006 including line of sight sensors, and references to time of day, weather and other relevant information from local and/or remote resources and databases 1004 including crowd sourced resources. Scene and situation identification (1002-1006) may be a common process baseline in support of the variety of hidden hazard identifications described herein based, for example, on ambient light sensors, acoustic sensors, seismic sensors and vision systems.

At 1007, a plurality of proximity sensor inputs 1008 for hidden hazard estimation are received. These inputs may include, for example, ambient light sensors, acoustic sensors, seismic sensors and vision systems 1008. The process at 1007 collects and classifies the information from the various proximity sensors 1008. In accordance with one embodiment, at least two of ambient light sensors, acoustic sensors, seismic sensors and vision systems provide information for collection and classification. In accordance with another embodiment, at least one of ambient light sensors and vision systems, and at least one of acoustic sensors and seismic sensors, provide information for collection and classification. Forward-looking ambient light sensors and/or vision system cameras may classify the regions of overlapping light within the host vehicle headlight illumination pattern based upon brightness/intensity and location. Vision system cameras may collect images preliminarily determined to correspond to light beam concentrations and classify them, for example, in accordance with a plurality of predetermined light beam characteristics including, for example, beam tightness/spread, beam intensity, beam direction, etc. Acoustic sensors and seismic sensors may collect respective acoustic and seismic waveforms and classify them based on a plurality of predetermined acoustic or seismic characteristics including, for example, energy level, continuity, frequency content, etc.

At 1009, presence of hidden hazards may be estimated based upon the collected and classified information 1007 from the sensors 1008, and a comparative process 1013 and/or a trained dynamic neural network (DNN) process 1015. With respect to ambient light sensing and headlight pattern overlapping, the comparative process 1013 may include retrieval of rules from local and/or remote databases 1004 defining overlap and non-overlap zones within the host vehicle headlight pattern with respect to the scene and situation information. Brightness comparatives for the zones are established and the classified regions of overlapping light within the host vehicle headlight illumination pattern from 1007 are compared thereto. A hidden target vehicle may thus be inferred from matching comparisons. With respect to vision system camera imaging of light beams, the comparative process 1013 may include retrieval of typical light beam images from hidden target vehicles from local and/or remote databases 1004 with respect to the scene and situation information. These typical images may be used as comparatives for the collected and classified vision system images at 1007. A hidden target vehicle may thus be inferred from matching comparisons. With respect to acoustic and seismic waveforms, the comparative process 1013 may include retrieval of acoustic and seismic signatures of interest from local and/or remote databases 1004 with respect to the scene and situation information. These signatures may be used as comparatives for the collected and classified acoustic and seismic waveforms at 1007. A hidden target vehicle may thus be inferred from matching comparisons. Each of the hidden target inferences may have associated confidence levels associated therewith.

With respect to DNN process 1015, offline training is performed. The training process may include, for each of the ambient light sensors, acoustic sensors, seismic sensors and vision systems, corresponding data collection across a matrix of road conditions and situations with one or more vehicles of different types. The collected data may undergo manual annotation of facts and ground truth through observation, preferably by vision system scene capturing. The annotated data is then used in the training of specific DNN models for each of the ambient light sensors, acoustic sensors, seismic sensors and vision systems. These trained DNN models are used in the DNN process wherein the collected and classified information 1007 from the sensors 1008 is input to the respective DNN model to provide hidden hazard inferences.

Each of the comparative process 1013 and the DNN process 1015 may be used alone or in combination to provide the respective hidden hazard inferences for each of the proximity sensors 1008. The presence of hidden hazards may thereby be estimated as probabilities of presence at 1011. The process 1000 may then repeat, continually updating the scene and situation information.

The process at 1011 may pass the plurality of probabilities corresponding to the plurality of proximity sensors 1008 to fusion process 1021 whereat the plurality of probabilities may be fused and a final determination made regarding presence of a hidden hazard. Data fusion at 1021 may be based upon rule-based priorities and weighting from 1019. 1019 may receive scene and situation based inputs from 1017 which in turn receives scene and situational information determined at 1003 and 1005. By way of example, 1017 may determine road characteristics such as pavement type and quality, highway or surface street, urban or rural, etc. 1017 may also determine environmental characteristics such as current weather conditions, noise pollution, mass transit proximity, time, light pollution, etc. Based upon such characteristics, the process at 1019 may apply dependent rules. For example, nighttime in urban locations where illumination is sparse may prioritize ambient light sensors and establish higher weighting for associated detections. Similarly, nighttime in urban locations where illumination is high may prioritize acoustic and seismic sensors over ambient light sensors and establish higher weighting for associated detections. The weightings thus established may be used in the fusion of the plurality of probabilities corresponding to the plurality of proximity sensors inputs at 1021 whereat the plurality of probabilities may be fused and a final determination made regarding presence of a hidden hazard. At 1023, the presence of a hidden hazard is alerted to the vehicle operator or utilized as a control input in vehicle controls.

Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements.

It should be understood that one or more steps within a method or process may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A method for determining the presence of a hidden hazard, comprising:
   identifying an operational scene for a host vehicle;
   identifying an operational situation for the host vehicle;
   collecting and classifying information from a plurality of proximity sensors, the information originating at a hidden hazard, wherein the hidden hazard is occluded from a line of sight between the proximity sensors and the hidden hazard;
   estimating a plurality of hidden hazard presence probabilities corresponding to the information from each of the plurality of proximity sensors, the operational scene, the operational situation, and at least one of a comparative process and a dynamic neural network process; and
   performing a fusion process upon the plurality of hidden hazard presence probabilities to determine the presence of the hidden hazard.

2. The method of claim 1, wherein collecting and classifying information from a plurality of proximity sensors comprises collecting and classifying information from an ambient light sensor, a vision system, an acoustic sensor and a seismic sensor.

3. The method of claim 1, wherein collecting and classifying information from a plurality of proximity sensors comprises collecting and classifying information from at least one of an ambient light sensor and a vision system, and from at least one of an acoustic sensor and a seismic sensor.

4. The method of claim 1, wherein collecting and classifying information from a plurality of proximity sensors comprises collecting ambient light and classifying regions of differing brightness.

5. The method of claim 1, wherein collecting and classifying information from a plurality of proximity sensors comprises collecting ambient light and classifying regions of overlapping headlight patterns from the host vehicle and at least one occluded target vehicle.

6. The method of claim 1, wherein collecting and classifying information from a plurality of proximity sensors comprises collecting images of light beams from a vision system and classifying the images based upon a plurality of predetermined light beam characteristics.

7. The method of claim 1, wherein collecting and classifying information from a plurality of proximity sensors comprises collecting acoustic waveforms and classifying the waveforms based on a plurality of predetermined acoustic characteristics.

8. The method of claim 1, wherein collecting and classifying information from a plurality of proximity sensors comprises collecting seismic waveforms and classifying the waveforms based on a plurality of predetermined seismic characteristics.

9. A system for determining the presence of a hidden hazard, comprising:
   a host vehicle;
   a plurality of proximity sensors associated with the host vehicle; and
   a controller configured to:
      identify an operational scene for the host vehicle;
      identify an operational situation for the host vehicle;
      collect and classify information from the plurality of proximity sensors, the information originating at a hidden hazard, wherein the hidden hazard is occluded from a line of sight between the proximity sensors and the hidden hazard;
      estimate a plurality of hidden hazard presence probabilities corresponding to the information from each of the plurality of proximity sensors, the operational scene, the operational situation, and at least one of a comparative process and a dynamic neural network process; and
      perform a fusion process upon the plurality of hidden hazard presence probabilities to determine the presence of the hidden hazard.

10. The system of claim 9, wherein the controller configured to collect and classify information from the plurality of proximity sensors comprises the controller configured to collect and classify information from an ambient light sensor, a vision system, an acoustic sensor and a seismic sensor.

11. The system of claim 9, wherein the controller configured to collect and classify information from the plurality of proximity sensors comprises the controller configured to collect and classify information from at least one of an ambient light sensor and a vision system, and from at least one of an acoustic sensor and a seismic sensor.

12. The system of claim 9, wherein the controller configured to collect and classify information from the plurality of proximity sensors comprises the controller configured to collect ambient light and classify regions of overlapping headlight patterns from the host vehicle and at least one occluded target vehicle.

13. The system of claim 9, wherein the controller configured to collect and classify information from the plurality of proximity sensors comprises the controller configured to collect images of light beams from a vision system and classify the images based upon a plurality of predetermined light beam characteristics.

14. The system of claim 9, wherein the controller configured to collect and classify information from the plurality of proximity sensors comprises the controller configured to collect acoustic waveforms and classify the waveforms based on a plurality of predetermined acoustic characteristics.

15. The system of claim 9, wherein the controller configured to collect and classify information from the plurality of proximity sensors comprises the controller configured to collect seismic waveforms and classify the waveforms based on a plurality of predetermined seismic characteristics.

16. A system for determining the presence of a hidden hazard, comprising:
   a host vehicle;
   a plurality of proximity sensors associated with the host vehicle comprising an ambient light sensor, a vision system, an acoustic sensor and a seismic sensor;
   a controller configured to:
      identify an operational scene for the host vehicle based on information comprising information corresponding to current geographic location of the host vehicle;
      identify an operational situation for the host vehicle based on information comprising information corresponding to dynamic conditions within the operational scene;

collect and classify information from the plurality of proximity sensors, the information originating at a hidden hazard, wherein the hidden hazard is occluded from a line of sight between the proximity sensors and the hidden hazard;

estimate a plurality of hidden hazard presence probabilities corresponding to the information from each of the plurality of proximity sensors, the operational scene, the operational situation, and at least one of a comparative process and a dynamic neural network process; and perform a fusion process upon the plurality of hidden hazard presence probabilities to determine the presence of the hidden hazard.

17. The system of claim 16, wherein the comparative process comprises retrieval of rules corresponding to the operational scene and operational situation defining overlap and non-overlap zones within a headlight pattern of the host vehicle, establishing brightness comparatives for the zones, and comparing the brightness comparatives to collected and classified regions of overlapping light within the headlight pattern of the host vehicle.

18. The system of claim 16, wherein the comparative process comprises retrieval of typical light beam images from hidden target vehicles corresponding to the operational scene and operational situation, and comparing the images to collected and classified vision system images.

19. The system of claim 16, wherein the comparative process comprises retrieval of acoustic signatures corresponding to the operational scene and operational situation, and comparing the signatures to collected and classified acoustic waveforms.

20. The system of claim 16, wherein the comparative process comprises retrieval of seismic signatures corresponding to the operational scene and operational situation, and comparing the signatures to collected and classified seismic waveforms.

* * * * *